(12) United States Patent
Ragland et al.

(10) Patent No.: US 6,181,825 B1
(45) Date of Patent: Jan. 30, 2001

(54) METHODS FOR PERFORMING 2-DIMENSIONAL MAXIMUM DIFFERENCES CODING AND DECODING DURING REAL-TIME FACSIMILE IMAGE COMPRESSION AND APPARATUS THEREFOR

(75) Inventors: Roderick J. Ragland, Bethesda; Spiros S. Dimolitsas, Gaithersburg; Franklin L. Corcoran, Rockville; Neil H. Tender, Potomac, all of MD (US)

(73) Assignee: Comsat Corporation, Bethesda, MD (US)

(*) Notice: Under 35 U.S.C. 154(b), the term of this patent shall be extended for 0 days.

(21) Appl. No.: 08/352,836

(22) Filed: Dec. 2, 1994

(51) Int. Cl.[7] ..................................................... G06K 9/36
(52) U.S. Cl. ........................ 382/239; 382/245; 382/233; 358/432; 358/426
(58) Field of Search .................................. 358/426, 427, 358/432, 433, 261.1, 261.3; 341/76; 382/239, 233, 245; 348/409, 415, 490, 484, 421

(56) References Cited

U.S. PATENT DOCUMENTS

| | | | |
|---|---|---|---|
| 4,303,947 | 12/1981 | Stoffel | 358/428 |
| 4,437,122 | 3/1984 | Walsh et al. | 358/447 |
| 4,807,043 | * 2/1989 | Kaku et al. | 358/261.3 |
| 4,809,081 | 2/1989 | Linehan | 358/432 |
| 5,193,121 | * 3/1993 | Elischer et al. | 382/7 |
| 5,291,303 | * 3/1994 | Ishikawa | 358/426 |
| 5,293,251 | 3/1994 | Corcoran et al. | 358/426 |
| 5,506,918 | * 4/1996 | Ishitani | 382/289 |
| 5,592,574 | * 1/1997 | Chilton et al. | 382/295 |

OTHER PUBLICATIONS

K. Knowlton, "Progressive Transmission of Gray–Scale and Binary Images by Simple, Efficient and Lossless Coding Scheme", Proceedings of IEEE, pp. 885–896, Jul. 1980.

CCITT Rcommendation T.6. "Facsimile Coding Schemes and Coding Control Functions for Group 4 Facsimile Apparatus". Melbourne 1988, Fascicle VII.3, vol. VII.

CCITT Recommendation T.4. "Standardization fo Group 3 Facsimile Apparatus for Document Transmissions". Melbourne 1988. Facsicle VII.3, vol. VII, pp. 21–47.

Spiros Dimolitsas and Frank L. Corcoran. "Compression of Facsimile Graphics for Transmission Over Digital Mobile Satellite Channels". MILCOM '91, McLean, VA, pp. 644–647, Nov. 4–7, 1991.

O. Johnsen, J. Segan, and G.L. Gash, "Coding of Two–Level Pictures by Pattern Matching and Substitution", The Bell System Techical Journal, vol. 62, No. 8, pp.2513–2545, Oct. 1983.

Spriros Dimolitsas and Franklin L. Corcoran, "Facsimile Compression for Transmission over 800 bit/s to 2400 bit/s Digital Mobile Channels". Proceedings, MILCOM '90, Monterrey, CA.

* cited by examiner

*Primary Examiner*—Cheukfan Lee
(74) *Attorney, Agent, or Firm*—Sughrue, Mion, Zinn, Macpeak & Seas, PLLC

(57) ABSTRACT

Compression and decompression methods for transmitting facsimile images in which the facsimile image is compressed in both vertical and horizontal directions are implemented using two dimensional maximum differences algorithms. Asymmetrical and fractional image compression are provided by controlling the number of lines, i.e., rows or columns, being compressed and by controlling the bit segment length used during each differences determination. The compressed facsimile image is decompressed by selecting a reference bit in the decompressed facsimile image and expanding the bit in both vertical and horizontal directions in accordance with a binary value of bits near the selected reference bit. A transmission channel adapted to serially perform the encoding and decoding functions is also described.

22 Claims, 11 Drawing Sheets

FIG. 7a

HORIZONTAL EXPANSION:

```
       a1
       a2
   a2  a0  a5       b1 b2 b3 b4
       a3
       a6
```

ENCODED PIXELS          EXPANDED PIXELS

FIG. 7b

VERTICAL EXPANSION:

```
  a1  a2  a3            b1
      a0                b2
  a4  a5  a6            b3
                        b4
```

ENCODED PIXELS          EXPANDED PIXELS

FIG. 7c

INTERPOLATION RULES:
  IF a0=WHITE, THEN b1=b2=b3=b4=WHITE
  IF a0=BLACK, THEN
    IF a2=a5, THEN b1=b2=b3=b4=BLACK
    IF a2≠a5, THEN
      IF a2=BLACK, THEN
        IF (a4=BLACK) OR (a6=BLACK), THEN b1=b2=b3=b4=BLACK
        OTHERWISE, b1=b2=BLACK, b3=b4=WHITE
      IF a5=BLACK, THEN
        IF (a1=BLACK) OR (a3=BLACK), THEN b1=b2=b3=b4=BLACK
        OTHERWISE, b1=b2=WHITE, b3=b4=BLACK

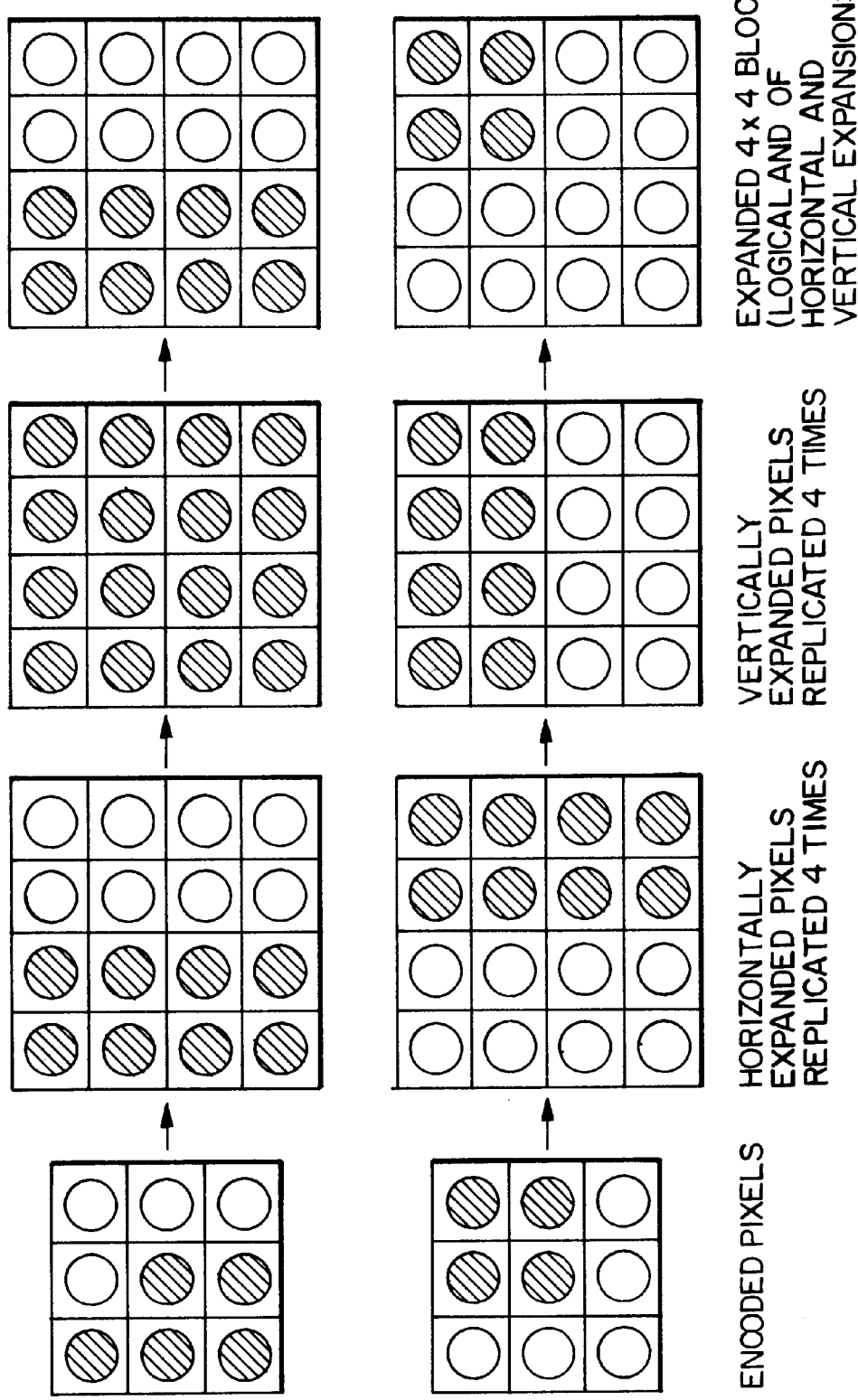

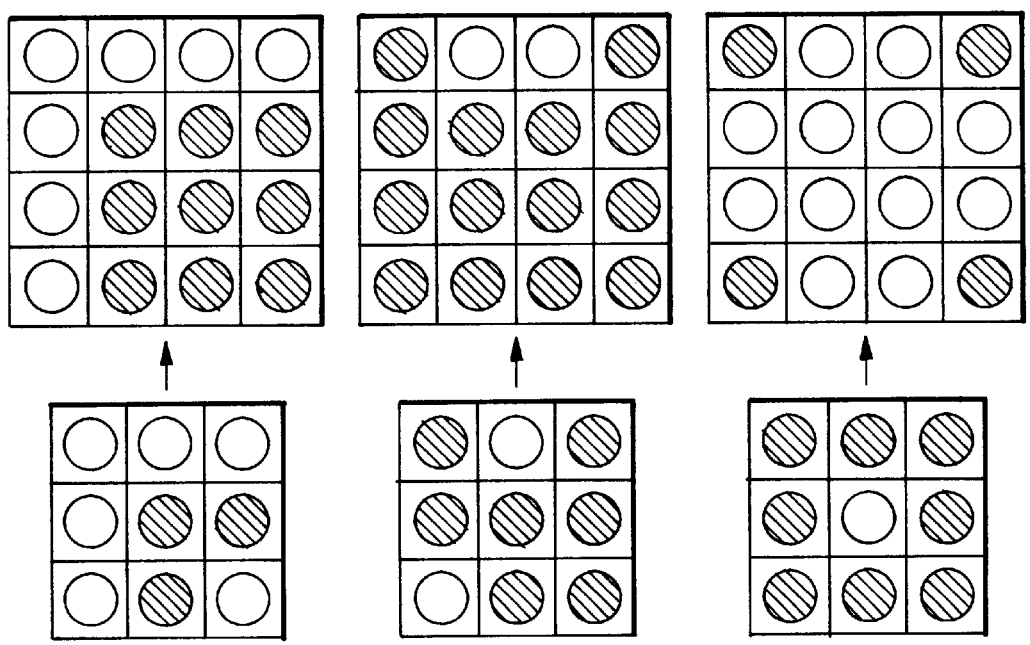
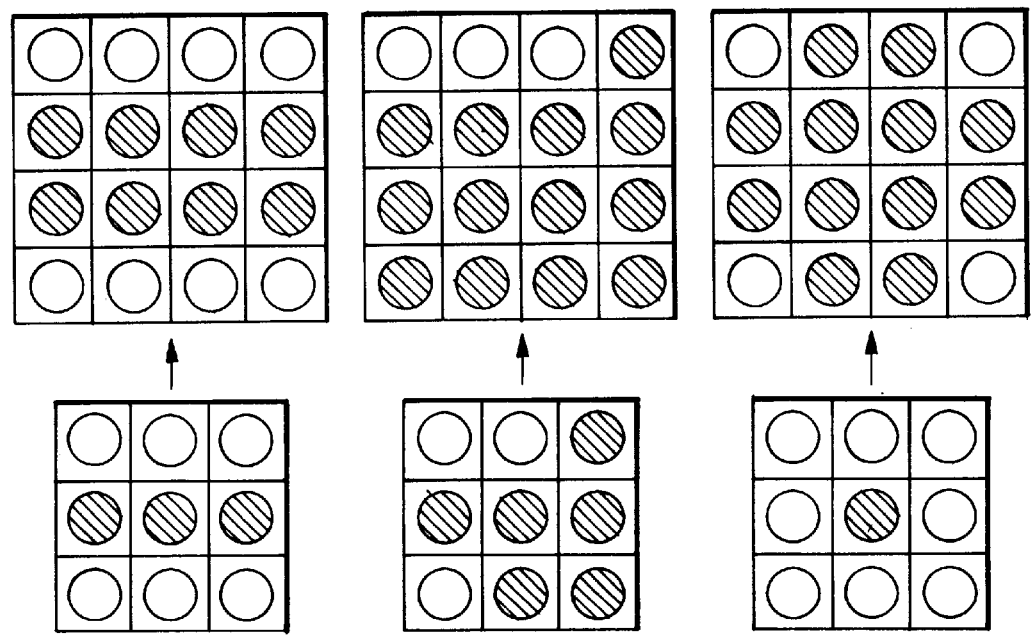
FIG. 9

FIG. 10A

OUTPUT POSSIBILITY B(BB)B:
- INPUT POSSIBILITY BBB → 48540 OCCURRENCES
- INPUT POSSIBILITY WBB → 0 OCCURRENCES
- INPUT POSSIBILITY BWB → 0 OCCURRENCES
- INPUT POSSIBILITY WWB → 0 OCCURRENCES
- INPUT POSSIBILITY BBW → 0 OCCURRENCES
- INPUT POSSIBILITY WBW → 0 OCCURRENCES
- INPUT POSSIBILITY BWW → 0 OCCURRENCES
- INPUT POSSIBILITY WWW → 0 OCCURRENCES

OUTPUT POSSIBILITY B(BB)W:
- INPUT POSSIBILITY BBB → 17756 OCCURRENCES
- INPUT POSSIBILITY WBB → 0 OCCURRENCES
- INPUT POSSIBILITY BWB → 0 OCCURRENCES
- INPUT POSSIBILITY WWB → 0 OCCURRENCES
- INPUT POSSIBILITY BBW → 0 OCCURRENCES
- INPUT POSSIBILITY WBW → 0 OCCURRENCES
- INPUT POSSIBILITY BWW → 0 OCCURRENCES
- INPUT POSSIBILITY WWW → 0 OCCURRENCES

OUTPUT POSSIBILITY W(BB)B:
- INPUT POSSIBILITY BBB → 15894 OCCURRENCES
- INPUT POSSIBILITY WBB → 5608 OCCURRENCES
- INPUT POSSIBILITY BWB → 0 OCCURRENCES
- INPUT POSSIBILITY WWB → 0 OCCURRENCES
- INPUT POSSIBILITY BBW → 0 OCCURRENCES
- INPUT POSSIBILITY WBW → 0 OCCURRENCES
- INPUT POSSIBILITY BWW → 0 OCCURRENCES
- INPUT POSSIBILITY WWW → 0 OCCURRENCES

FIG. 10B

OUTPUT POSSIBILITY W(BB)W:
- INPUT POSSIBILITY BBB → 6477 OCCURRENCES
- INPUT POSSIBILITY WBB → 5870 OCCURRENCES
- INPUT POSSIBILITY BWB → 0 OCCURRENCES
- INPUT POSSIBILITY WWB → 0 OCCURRENCES
- INPUT POSSIBILITY BBW → 0 OCCURRENCES
- INPUT POSSIBILITY WBW → 0 OCCURRENCES
- INPUT POSSIBILITY BWW → 0 OCCURRENCES
- INPUT POSSIBILITY WWW → 0 OCCURRENCES

OUTPUT POSSIBILITY B(WB)B:
- INPUT POSSIBILITY BBB → 0 OCCURRENCES
- INPUT POSSIBILITY WBB → 1611 OCCURRENCES
- INPUT POSSIBILITY BWB → 2093 OCCURRENCES
- INPUT POSSIBILITY WWB → 3249 OCCURRENCES
- INPUT POSSIBILITY BBW → 0 OCCURRENCES
- INPUT POSSIBILITY WBW → 165 OCCURRENCES
- INPUT POSSIBILITY BWW → 0 OCCURRENCES
- INPUT POSSIBILITY WWW → 0 OCCURRENCES

OUTPUT POSSIBILITY B(WB)W:
- INPUT POSSIBILITY BBB → 0 OCCURRENCES
- INPUT POSSIBILITY WBB → 1443 OCCURRENCES
- INPUT POSSIBILITY BWB → 1061 OCCURRENCES
- INPUT POSSIBILITY WWB → 3530 OCCURRENCES
- INPUT POSSIBILITY BBW → 0 OCCURRENCES
- INPUT POSSIBILITY WBW → 1049 OCCURRENCES
- INPUT POSSIBILITY BWW → 0 OCCURRENCES
- INPUT POSSIBILITY WWW → 0 OCCURRENCES

FIG. 10C

OUTPUT POSSIBILITY W(WB)B:
- INPUT POSSIBILITY BBB → 0 OCCURRENCES
- INPUT POSSIBILITY WBB → 13965 OCCURRENCES
- INPUT POSSIBILITY BWB → 0 OCCURRENCES
- INPUT POSSIBILITY WWB → 32781 OCCURRENCES
- INPUT POSSIBILITY BBW → 0 OCCURRENCES
- INPUT POSSIBILITY WBW → 0 OCCURRENCES
- INPUT POSSIBILITY BWW → 0 OCCURRENCES
- INPUT POSSIBILITY WWW → 0 OCCURRENCES

OUTPUT POSSIBILITY W(WB)W:
- INPUT POSSIBILITY BBB → 0 OCCURRENCES
- INPUT POSSIBILITY WBB → 13121 OCCURRENCES
- INPUT POSSIBILITY BWB → 0 OCCURRENCES
- INPUT POSSIBILITY WWB → 22272 OCCURRENCES
- INPUT POSSIBILITY BBW → 0 OCCURRENCES
- INPUT POSSIBILITY WBW → 0 OCCURRENCES
- INPUT POSSIBILITY BWW → 0 OCCURRENCES
- INPUT POSSIBILITY WWW → 0 OCCURRENCES

OUTPUT POSSIBILITY B(BW)B:
- INPUT POSSIBILITY BBB → 0 OCCURRENCES
- INPUT POSSIBILITY WBB → 0 OCCURRENCES
- INPUT POSSIBILITY BWB → 0 OCCURRENCES
- INPUT POSSIBILITY WWB → 0 OCCURRENCES
- INPUT POSSIBILITY BBW → 1714 OCCURRENCES
- INPUT POSSIBILITY WBW → 0 OCCURRENCES
- INPUT POSSIBILITY BWW → 4269 OCCURRENCES
- INPUT POSSIBILITY WWW → 0 OCCURRENCES

FIG. 10D

OUTPUT POSSIBILITY B(WW)B:
- INPUT POSSIBILITY BBB → 0 OCCURRENCES
- INPUT POSSIBILITY WBB → 0 OCCURRENCES
- INPUT POSSIBILITY BWB → 0 OCCURRENCES
- INPUT POSSIBILITY WWB → 0 OCCURRENCES
- INPUT POSSIBILITY BBW → 0 OCCURRENCES
- INPUT POSSIBILITY WBW → 0 OCCURRENCES
- INPUT POSSIBILITY BWW → 488 OCCURRENCES
- INPUT POSSIBILITY WWW → 5715 OCCURRENCES

OUTPUT POSSIBILITY B(WW)W:
- INPUT POSSIBILITY BBB → 0 OCCURRENCES
- INPUT POSSIBILITY WBB → 0 OCCURRENCES
- INPUT POSSIBILITY BWB → 0 OCCURRENCES
- INPUT POSSIBILITY WWB → 0 OCCURRENCES
- INPUT POSSIBILITY BBW → 0 OCCURRENCES
- INPUT POSSIBILITY WBW → 0 OCCURRENCES
- INPUT POSSIBILITY BWW → 1226 OCCURRENCES
- INPUT POSSIBILITY WWW → 50949 OCCURRENCES

OUTPUT POSSIBILITY W(WW)B:
- INPUT POSSIBILITY BBB → 0 OCCURRENCES
- INPUT POSSIBILITY WBB → 0 OCCURRENCES
- INPUT POSSIBILITY BWB → 0 OCCURRENCES
- INPUT POSSIBILITY WWB → 0 OCCURRENCES
- INPUT POSSIBILITY BBW → 0 OCCURRENCES
- INPUT POSSIBILITY WBW → 0 OCCURRENCES
- INPUT POSSIBILITY BWW → 0 OCCURRENCES
- INPUT POSSIBILITY WWW → 75786 OCCURRENCES

FIG. 10E

```
OUTPUT POSSIBILITY W(WW)W:
    INPUT POSSIBILITY BBB → 0 OCCURRENCES
    INPUT POSSIBILITY WBB → 0 OCCURRENCES
    INPUT POSSIBILITY BWB → 0 OCCURRENCES
    INPUT POSSIBILITY WWB → 0 OCCURRENCES
    INPUT POSSIBILITY BBW → 0 OCCURRENCES
    INPUT POSSIBILITY WBW → 0 OCCURRENCES
    INPUT POSSIBILITY BWW → 0 OCCURRENCES
    INPUT POSSIBILITY WWW → 2640700 OCCURRENCES
```

METHODS FOR PERFORMING 2-DIMENSIONAL MAXIMUM DIFFERENCES CODING AND DECODING DURING REAL-TIME FACSIMILE IMAGE COMPRESSION AND APPARATUS THEREFOR

FIELD OF THE INVENTION

The present invention relates generally to real time facsimile image compression. More specifically, the present invention relates to a plurality of efficient methods for the real-time encoding of bi-level graphics, e.g., facsimile images. The inventive methods are particularly suited for mobile communication applications using a 2-dimensional bit-reduction, e.g., decimation, scheme. The methods developed are particularly applicable to the coding of handwritten and typed-text and are suitable for incorporation in the middle, rather than the terminating-points, of a communications network. An apparatus specifically adapted to perform the enumerated methods is also disclosed.

BACKGROUND OF THE INVENTION

The emerging use of low-rate coding and digital transmission in mobile satellite communications and the increasing use of facsimile services have identified the desirability for visual service transparency over the same very narrow-band circuits. The economic viability of such a service, however, rests on the capability of introducing further image message compression, either in real-time or off-line during a so-called store-and-forward operation. In addition to the economic side, however, long document transmission times negatively impact the customer perceived quality of service in that, over narrow-band circuits, several minutes might be required for the transmission of documents that would normally need only seconds when transmitted through the public switch telephone network. In order to achieve these objectives, some form of image compression over and above what is provided by traditional Group 3 facsimile is needed.

Of general interest are U.S. Pat. No. 4,779,266 to Chung et al., which discloses methods and corresponding circuitry for encoding and decoding information with code patterns which engender the two-state equivalent of electronic orthogonal coding. These special code patterns, referred to as optimizing orthogonal codes, are useful in system having only two signal propagation states, e.g., optical processors and U.S. Pat. No. 4,695,971 to Reimann, which discloses circuitry for rapidly determining the greatest difference among three binary numerical values which undertakes a classification and coding of the maximum difference within a number of different numerical ranges.

References of limited interest include U.S. Pat. No. 3,971,88 to Ching et al., which discloses a synchronization system for variable length encoded signals, U.S. Pat. No. 3,938,085 to Battail, which discloses a transmission system including a transmitting station and a receiving station for operating with a systematic recurrent code, and U.S. Pat. No. 3,927,372 to Zschunke, which discloses techniques for improving the reproduction of amplitude jumps in a differential pulse code modulation (DPCM) system based on the use of maximum difference value code words.

Currently there are several methods in use for encoding bi-level graphics. These include:

a. One-dimensional Huffman Coding, which is used to encode colored (black or white) strips of picture elements (pixels) when an image is raster-scanned and digitized. A well known algorithm belonging to this class of techniques is the 1-Dimensional Run-Length Coding (RLC) which has become an international standard. See CCITT Recommendation T.4., "Standardization of Group 3 Facsimile Apparatus for Document Transmissions", Melbourne 1988, Fascicle VI1.3 Volume VII, Pages 21–47. The 1-Dimensional RLC consists of a Huffman Code that has been suitably modified to increase its robustness in the presence of telephone network-type of impairments. The 1-Dimensional RLC is a powerful technique that permits the lossless coding of bi-level images and is able to achieve a bit-rate requirement reduction on the order of 10:1, depending on the statistical content of the image encoded. However, since group 3 facsimile messages are already encoded using this technique there can be little, if any, benefit derived by further compressing such images in the network using the same, or a modified version of this approach.

b. To increase the compression achievable, a two dimensional version of the 1-Dimensional RLC technique has also been developed. See CCITT Recommendation T.4. In the 2-Dimensional RLC method, only the first scan-line of image information is encoded in accordance to the 1-Dimensional RLC. Subsequently, the differences between adjacent lines, rather than the actual scan-lines, are encoded using a technique that is essentially the same as 1-Dimensional RLC. The 2-Dimensional RLC is also a loss-less coding method. However, because of its increased image redundancy removal, it is more susceptible to telephone network-type of transmission impairments. As a result, 1-Dimensional RLC of the actual scan-lines is used every few lines to assure that re-synchronization can be established even when some of the encoded information has been corrupted. As a result, its performance is somewhat limited. Furthermore, since, as stated earlier, group 3 facsimile messages are already encoded using this standardized technique, there can be little additional benefit realized, e.g., an additional 20%, by further compressing such images in the network using a 2-dimensional Huffman coding approach, or a variant thereof.

c. If the communications channel can be assumed to be error free, e.g., when automatic repeat request procedures are employed, a slightly more efficient method of 2-D RLC can be derived. In this method, all image scan-lines are coded on an adjacent line differential basis and 1-Dimensional RLC is not repeated for re-synchronization. This method is somewhat more efficient in that a compression ratios of the order of 20:1 can be achieved. However, the underlying error-free channel assumption is noted. This method has also been standardized, and is covered by, for example, CCITT Recommendation T.6, entitled "Facsimile Coding Schemes and Coding Control Functions for Group 4 Facsimile Apparatus" (Melbourne 1988, Fascicle VII.3, Volume VII).

d. Other techniques for the coding of facsimile images have also been used. See K. Knowlton, "Progressive Transmission of Gray-Scale and Binary Images by Simple, Efficient and Lossless Coding Scheme", Proceedings of IEEE, pp. 885–896 (July 1980), and N. S Jayant et al., "Digital Coding of Waveforms", Prentice Hall (1984). Some of these employ transform domain techniques and promise to be effective, but primarily only when dealing with graphical information such as gray level, or highly detailed images. As a result, such methods have not demonstrated their optimal abilities when coding bi-level handwritten graphics for mobile communication applications.

e. Another technique which has proven to be powerful is based on the segmentation of an image into many sub-images and in subsequently matching the content of these sub-images by elements drawn from a code-book of elementary images. The process is completed by transmitting over the communications channel a code-word representing the identity of the elementary image most closely resembling the image's sub-image. Such techniques combine pattern recognition principles and vector quantization and have demonstrated that significant compression ratios can be achieved, e.g., more that 100:1, if the code-book used is well suited to the image contention a microscope scale). See O. Johnsen et al., "Coding of Two-Level Pictures by Pattern Matching and Substitution", The Bell System Technical Journal, Vol. 62, No. 8, pp. 2513–2545 (October 1983) as well as Super Fax Compression, COMSAT Laboratories Final Report under Contract MCS-10 (December 1991). Despite the impressive compression ability of these techniques, some limitations should be noted when the image structure is not well matched to the codebook contents. First, the compression ratios realized are significantly lower than 100:1. Second, these techniques are information lossy, i.e., the reconstructed image quality is degraded when compared to the original image. In particular, if the image structure is not well matched to the codebook's contents, the reconstructed image quality can be significantly degraded. As a result, the performance of these techniques is essentially limited to compression ratios in the range of 40:1 to 100:1 and their use can be primarily confined to typed text, where the outline of the characters to be coded is well defined and uniform throughout a document.

f. A technique called Vector Encoding with a Distortion Criterion (VEDC), was proposed but not disclosed by COMSAT Corporation employees which models each character within an image as a short sequence of interlocked 2-dimensional vectors whose lengths and directions are coded using variable length Huffman coding. The coding process is completed when a location is provided for the origin of the first vector associated with each character. This technique has the ability to efficiently encode line graphics, as well as handwritten or typed text, while maintaining a constant level of distortion across the encoded page. This method is primarily geared towards the so-called store-and-forward operation, rather than real-time operations, or else the full compression efficiency benefits can not be realized.

g. Finally, a set of techniques known as "Maximum Differences" and "Analysis-by-Synthesis" have been proposed. See commonly-assigned U.S. Pat. No. 5,293,251, which is incorporated herein by reference for all purposes. See also the articles by Spiros Dimolitsas and Franklin L. Corcoran, co-inventors of U.S. Pat. No. 5,293,251, entitled "Facsimile Compression for Transmission over 800 bit/s to 2400 bit/s Digital Mobile Circuits", Conference Proceedings, *IEEE Military Communications Conference,* MILCOM '90, Monterey, Calif., and "Compression of Facsimile Graphics for Transmission over Digital Mobile Satellite Channels", Conference Proceedings, *IEEE Military Communications Conference,* MILCOM '91, McLean, Va, pp. 644–647 (November 4–7, 1991).

The present invention was motivated by a desire to overcome the perceived problems in the techniques enumerated immediately above. For example, while the techniques described in U.S. Pat. No. 5,293,251 and the two MILCOM articles were suitable for the real-time network compression of facsimile images, it was not until the present invention was made that these techniques became usable, since these techniques not considered suitable for encoding either typed text or bi-level graphics which incorporated a significant amount of detail.

SUMMARY OF THE INVENTION

The present invention relates to method for reducing transmission requirements related to facsimile images while maintaining high intelligibility in mobile communications environments.

According to one aspect of the invention, a low-cost facsimile interface unit (FIU) of the type disclosed in U.S. patent applications Ser. Nos. 07/720,990 and 07/754,785, which is suitable for facsimile communication between low-power mobile earth stations and fixed earth stations for both point-to-point and point-to-multipoint transmissions, can be enhanced by improved and optimized coding and decoding methods treating the intermediate form of the image being transmitted. These methods operates on small numbers of scan lines, thus, lending themselves to use in real-time operations over satellite channel rates ranging from 2400 bit/s to 800 bit/s.

The method according to the invention are designed to emphasize the intelligibility retention of both typed-text and hand-written images. These methods offer high reconstruction intelligibility and only little additional quality degradation when compared with standard resolution facsimile coding, which are limited to a compression ratio of approximately 12 to 1.

The basic idea behind the compression methods of the invention is the selective removal of pixel information from an intercepted document that is being transmitted using the CCITT Recommendation T.4 run-length coding (RLC). Subsequently, an intermediate sized image is generated using a selected two dimensional maximum differences algorithm and the resulting image is then encoded using optimized RLC prior to transmission over the digital channel.

These and other objects, features and advantages of the invention are disclosed in or will be apparent from the following description of preferred embodiments.

BRIEF DESCRIPTION OF THE DRAWINGS

The preferred embodiments are described with reference to the drawings in which like elements are denoted by like or similar numbers and in which:

FIG. 7 illustrates the interpolation rules used in the original 4×4 decoder wherein FIG. 7(*a*) illustrates horizontal expansion, FIG. 7(*b*) illustrates vertical expansion and FIG. 7(*c*) illustrates exemplary interpolation rules under which expansion is performed;

FIG. 8 illustrates two examples of pixel to 4×4 block expansions performed by the M-S decoder according to a preferred embodiment of the present invention;

FIG. 9 illustrates examples of 3×3 to 4×4 pixel block mappings in the T-D decoder according to another embodiment of the present invention; and FIG. 10 illustrates encoder statistics generated during vertical compression using a two-dimensional fractional maximum differences encoder according to a preferred embodiment of the present invention.

DESCRIPTION OF THE PREFERRED EMBODIMENTS

Using the techniques disclosed here, the ability to achieve moderate coding efficiency (e.g., 2 to 4 times better than Group 3 facsimile, 1-Dimensional RLC) and acceptable image quality retention has been demonstrated for both handwritten and typed text while at the same time it is suitable for real-time network operation. The advantages and distinctions between conventional compression and//or decompression techniques and the preferred embodiments of the inventive method will best be understood by briefly describing the conventional techniques prior to present detailed descriptions of the preferred embodiments.

Most of the more popular facsimile machines and personal computer (PC) plug-in cards support the CCITT Recommendation T.4 standard for document transmission over Group 3 facsimile systems. The T.4 standard employs a one-dimensional lossless image compression scheme to reduce transmission time by a factor of 6 to 12, depending upon the contents of the document. Because of this compression, the time needed to transmit a single page over a 9600 bit/s line is about 15–30 seconds rather than 3 minutes.

Figure 1:
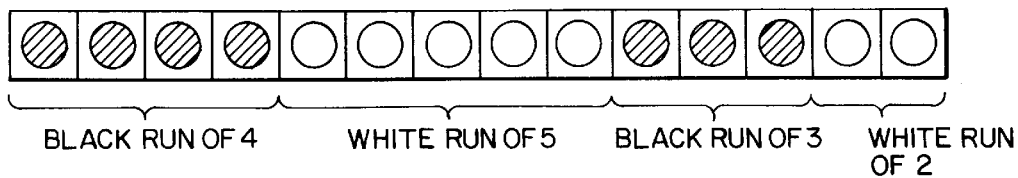
FIG. 1 is an illustration displaying a portion of a facsimile image scan line which is useful in understanding run-length encodings.

The compression algorithm used by T.4 is a modified form of Huffman run-length coding. It is based on the observation that for any given scan line in a typical 1728× 1100 (horizontal by vertical) standard mode facsimile image, there tend to be long "runs" of black and white pixels. These strings of pixels occur because the fax documents are made up of lines with an almost uniform thickness. i.e, strokes of the pen or characters in a font, that are made up of black runs and which are separated by white runs. In run-length coding, a scan line is encoded as a series of numbers representing the lengths of these runs rather than as individual pixels, thus resulting in significant compression gains. FIG. 1 contains an example run-length coding on a portion of a facsimile image scan line. The encoded run-lengths alternate between white and black runs across the scan line.

Another important characteristic of facsimile images is that some run-lengths occur more frequently than others. For example, one would expect a significantly larger number of short black run-lengths than long black run-lengths because of the many thin lines, i.e., pen strokes or font, on the page. By comparison, not many long strings of black pixels occur in the ordinary handwritten or typed documents that tend to be transmitted by a fax machine. A similar effect can be observed for white run-lengths, which occur most frequently in-between black pen strokes or in association with blank image scan-lines.

Because of this property, a coding scheme that gives an equal number of bits to each run-length would have some statistical redundancy and would therefore be sub-optimal. To improve the compression gain further, the T.4 standard uses Huffman variable-length codes for run-lengths. Runs that have a high probability of occurring are assigned shorter code words, and runs that have a low probability of occurring are given longer code words. The result is a much more efficient coding scheme that achieves compression gains on the order of 6 to 12, depending upon the entropy of the particular image.

The Maximum Differences facsimile image encoding algorithm, as disclosed in U.S. Pat. No. 5,293,251, can compress a fax document by a significantly greater factor than the T.4 standard can, albeit at the expense of a distortionless transmission. At the encoding end, the 1728×1100 standard mode image is first pixel-decimated by a fixed amount both horizontally and vertically using the Maximum Differences algorithm. Thus, the image is shrunk down in a manner so as to preserve as much of the detail as possible. It will be appreciated that this is where loss is introduced into the image in a controlled manner. Next, the bit-reduced image is passed through a lossless Huffman run-length encoder very similar to that used by the CCITT Rec. T.4 standard. The image decimation process has an effect on the run-length probability density functions (pdfs) that degrades the performance of the run-length coding, but the total compression, i.e., decimation and run-length coding, is still significantly greater than the achieved by T.4 coding alone.

At the decoding end, an inverse Huffman run-length coding routine recovers the decimated image bitmap that was generated by the encoder by detecting the individual code words and converting them back to run-lengths. This lossless stage of the expansion process introduces no new distortion. Finally, the condensed image is expanded by a fixed amount both horizontally and vertically back in to a 1728×1100 standard mode facsimile image. The expansion routine attempts to interpolate the missing pixel information by taking into account the properties of typical handwritten or typed facsimile pages. The reconstructed image is not identical to the original, but maintains most of the essential details and is perfectly intelligible for the types of images transmitted through facsimile equipment.

In order to realize the benefits obtained by employing image compression in facsimile transmissions, a device that allows end-user terminal equipment to transmit facsimile images as demodulated bits over low-rate digital links is required. This device, a so-called Facsimile Interface Unit (FIU), must permit end-userterminal equipment to transmit facsimile images as demodulated bits over low-rate digital links.

With an FIU at each end of the link, two fax machines can communicate as if they were connected through an ordinary telephone line, even though the actual transfer of data takes place through the lower rate connection. With facsimile image compression employed, the FIUs can use even lower bit-rate links to transmit the same facsimile pages. It will be noted that this change is invisible to the facsimile terminal equipment, while the actual amount of transmitted bits is reduced significantly.

Figure 2:
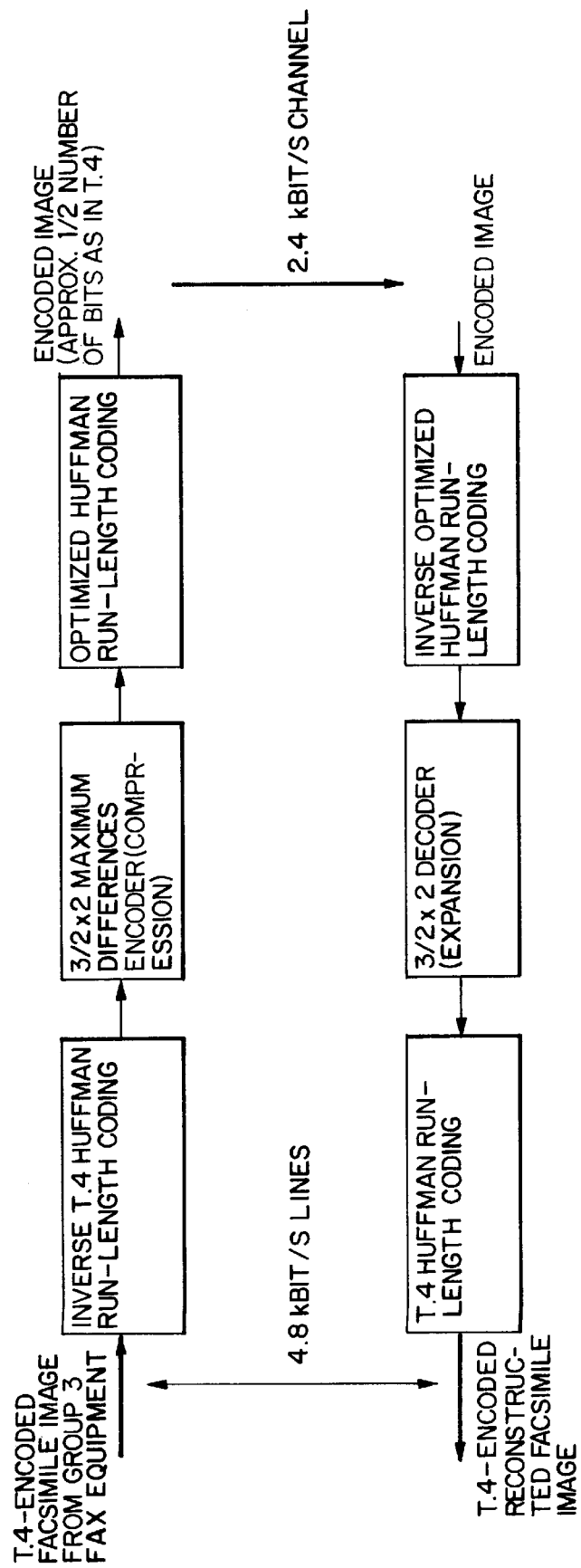
FIG. 2 is a flow diagram of facsimile image data, which advantageously can be used according to the present invention, through each stage of the selected algorithm.

FIG. 2 contains a block diagram of the different stages of facsimile compression as implemented on an FIU platform which allows fax machines communicating at 4800 bit/s to transfer data over 2400 bit/s channels. In the example shown in FIG. 2, it is assumed that the image is compressed by a factor of 2 using a encoder/decoder pair which are parametrically designated as "3/2×2". At the transmitting FIU, 4800 bit/s of T.4-encoded data from the transmitting fax equipment is first decoded on a scan-line basis. It will be appreciated that when the entire image is processed, this corresponds to a full size image of 1728×1100 pixels. Then, a Maximum Differences type of image compression algorithm is applied which generates a smaller 864×732 image, once the entire image has been fully decoded and decompressed. Next, the pixels are Huffman run-length encoded with an optimized set of code words, where the selected code words are based on the new reduced image statistics. These compression steps yield a gain of 2:1 over the T.4-encoded data, allowing the data to be transmitted over a 2400 bit/s channel. It will be noted that at the receiving FIU, the Huffman run-length encoded data is converted back into the reduced 864×732 bitmap, an exact copy of the intermediate image generated by the encoder. This intermediate image is then expanded back to its original size by an algorithm that attempts to interpolate all of the needed pixel information, thereby resulting in the reconstructed image. Finally, the full size 1728×1100 reconstructed bitmap is encoded with the T.4 compression scheme and transmitted at 4800 bit/s to the receiving fax equipment.

All of the above steps are performed in real-time to minimize the propagation delay of the transmission of scan lines.

During its development, the Maximum Differences class of encoding algorithms went through several distinct stages. To understand the motivations behind a number of aspects of its design requires a familiarity with the progress of the algorithm through each of the stages.

An early Maximum Differences coder disclosed by Spiros Dimolitsas and Franklin L. Corcoran to the other co-inventors of the present invention, and described in an unpublished article entitled "Facsimile Compression in Mobile Communications," was geared more towards higher compression gains and less towards retaining the reconstructed image's quality. This provided fixed compression factors of 4:1 along each axis for fine resolution facsimile documents (1728×2200 pixels). This resulted in an effective compression ratio of approximately 3:1 compared to a standard resolution facsimile, but the image quality degradation resulting from this process rendered the coder suitable only for the compression of large-type handwritten text documents.

To simplify the development of stimulation software, the Maximum Differences compression was only applied in the vertical direction for decimation by a factor of 2. Horizontal reduction by a factor of 2 was achieved by a simpler dithering pattern pixel-removing procedure. Reduction by another factor of 2 along each axis was achieved by an inclusive ORing process. Table 1 lists the four stages of this procedure.

TABLE 1

| Stage 1 | Vertical reduction by factor of 2 using Maximum Differences |
| Stage 2 | Horizontal reduction by factor of 2 using dithering pattern |
| Stage 3 | Vertical reduction by additional factor of 2 using inclusive OR |
| Stage 4 | Horizontal reduction by additional factor of 2 using inclusive OR |

Figure 3:
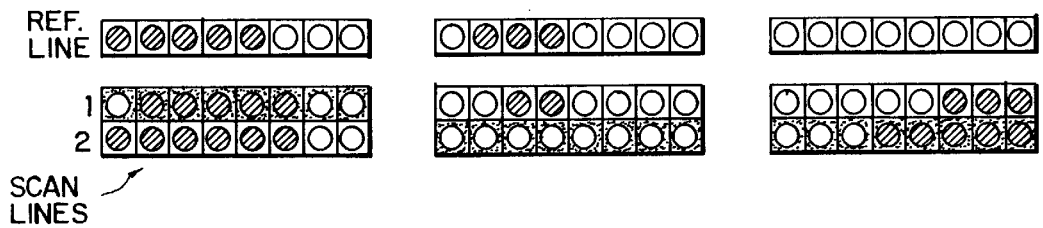
FIG. 3 illustrates an example of a 2:1 vertical reduction using the so-called original maximum differences algorithm, wherein the shaded region forms an encoded scan line.

Stage 1 uses the original Maximum Differences algorithm to reduce every pair of source scan lines to a single encoded scan line, achieving a vertical reduction of 2 to 1. FIG. 3 illustrates how this is accomplished. Starting from the top of the page, two scan lines and a reference line are divided into 8-pixel segments, i.e., octets. For each of these segments, the pixels from one of the two scan lines are selected and placed on the reduced output line. The particular scan line that is chosen for each segment is the one with the greater number of bit-wise differences between the segment itself and the corresponding portion of the reference line. If the number of pixels that differ between the reference line and each of the scan lines is the same, then the scan line whose segment has the greater number of internal transitions is chosen. When the entire scan line has been processed, the reduced output line becomes the reference line that is used for the compression of the next two scan lines and the process repeats. Thus, each line of the reduced image contains pixels from a pair of source scan lines. In FIG. 3, the shaded segments are the ones that are to be placed on the output line (i.e., octet 1-line 2, octet 2-line 2-line 2, octet 3-line 2).

It should be noted that the reference line always contains the output scan line from the reduction of the previous pair of lines. For the compression of the first two lines, the reference line can take on an initial value of all white pixels (since the page has a white background) or it can simply be a copy of the first scan line.

Stage 2 of the reduction process uses a dithering pattern to compress the image by a factor of 2 horizontally. In essence, the odd-numbered pixels are removed from the even-numbered scan lines, while the even-numbered pixels are removed from the odd-numbered scan lines.

During Stage 3 of the reduction process, a black pixel-preserving OR algorithm achieves another factor of 2 in vertical compression. For every pair of source scan lines, a single reduced output scan line is computed as the logical OR of the two source lines, where a white pixel is represented by a 0 and a black pixel is represented by a 1. In other words, if either the two source pixels in a given horizontal pixel position is black, the output scan line pixel at that position is also black. Otherwise, the output pixel is white.

The fourth and final stage of compression is a logical OR in the horizontal direction. For every two columns of pixels, a single reduced output column is computed as the logical OR of the two source columns. The output pixel for a column on a given line is black only if either of the pixels on the source columns of this line is black.

With the above background firmly in mind, the preferred embodiments according to the present will now be described. One such preferred embodiment is an improved version of the Maximum Differences algorithm, which is outlined in Table 2.

TABLE 2

| Stage 1 | Simultaneous horizontal and vertical reduction by a factor of m using the Maximum Differences algorithm with pixel segments of size I |
| Stage 2 | Vertical reduction by additional factor of n using inclusive OR |
| Stage 3 | Horizontal reduction by additional factor of n using inclusive OR |

This modified version of the Maximum Differences encoder, hereinafter referred to as a 2-Dimensional Modified Maximum Differences (2-D MMD), implements a new approach for coding images. It will be readily appreciated by comparing Tables 1 and 2 that the 2-D MMD algorithm has basic differences from the original that make it more flexible and allow it to be more selective about the removal of pixels from the source image.

First of all, the compression factors are variable in each of the three stages employed by the 2-D MMD algorithm. Stage 1, the so-called Maximum Differences reduction stage, advantageously can decrease the size of an image by an integral factor of m along each axis. It uses the same algorithm as before, but compares m (rather than 2) pixel segments to the reference line in order to select one line segment. Preferably, the inclusive OR reduction stages. i.e., stages 2 and 3, logically combine every n rows and n columns into one.

Second, the 2-D MMD algorithm preferably allows variable size pixel comparison segments during performance of the Maximum Differences stage, i.e., stage 1. Advantageously, the segments do not necessary have to be 8 bits wide; any integral size 1 can be used. Finally, in the 2-D MMD algorithm, both horizontal and vertical compression advantageously can be performed simultaneously during the Maximum Differences stage.

Figure 4:
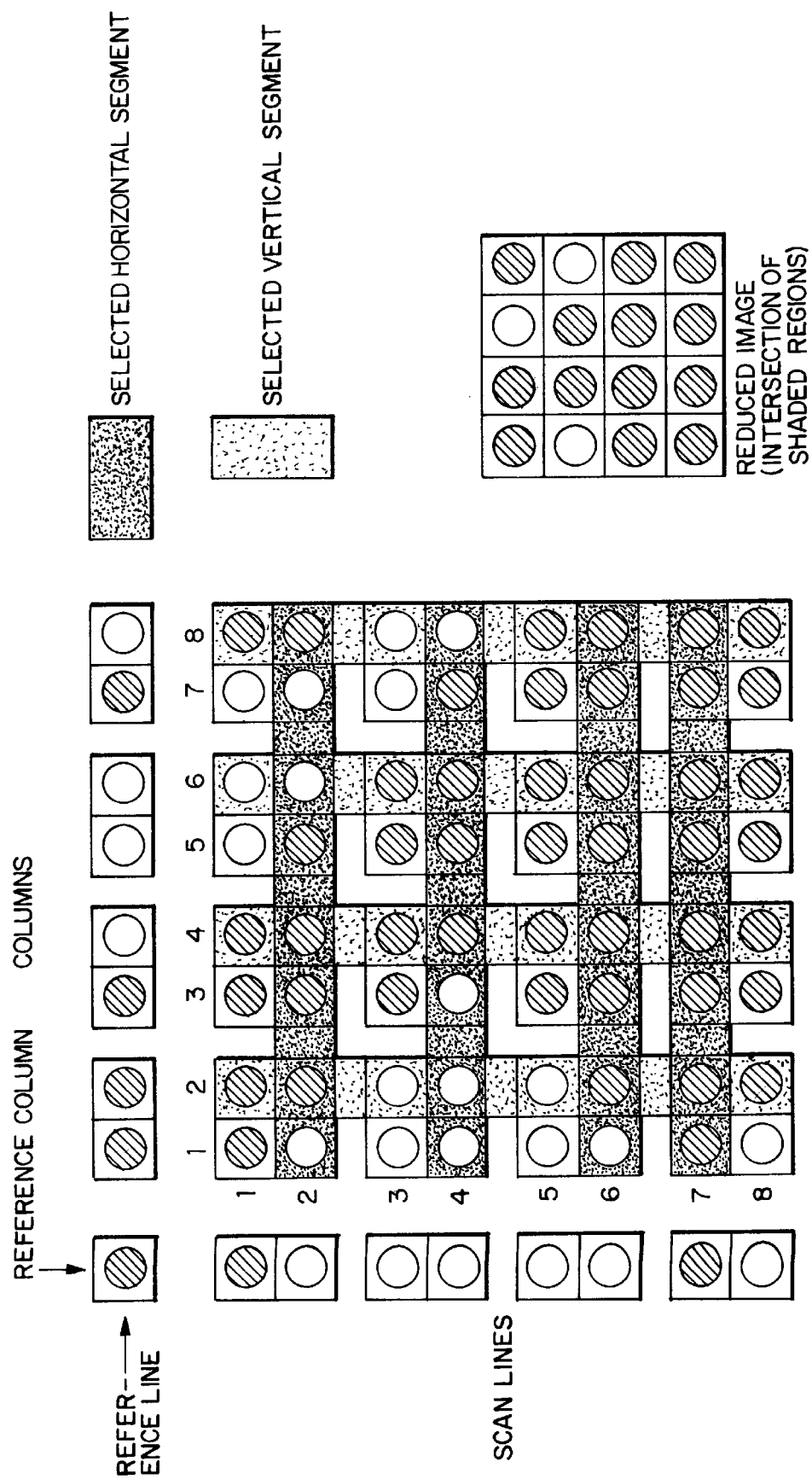
FIG. 4 illustrates an example of two-dimensional Modified Maximum Differences (2-D MMD) algorithm (m=2, 1=8) processing according to the present invention, wherein shaded regions indicate selected segments of the original image.

FIG. 4 is an exemplary illustration which is useful in understanding the two-dimensional image reduction method according to the present invention, which reduces an image by a factor of 2 along each axis with a comparison segment size of 8. Both a reference line and a reference column are maintained, and the horizontal and vertical pixel segments that have the most differences from their respective reference segments are selected. These segments are indicated by the shaded regions in FIG. 4, each consisting of 8 contiguous pixels. The reduced image output is constructed from the pixels at the intersections of the horizontal and vertical pixel segments. Thus, intersections of the shaded regions in FIG. 4 form the 4×4 reduced image shown in the bottom right corner.

As with the one-dimensional encoder described above, each of these segments becomes the reference segment for the next comparison. It will be appreciated that this generalized Maximum Differences algorithm degenerates to the original one-dimensional vertically compressing technique when the simultaneous horizontal compression is skipped.

Experiments with different comparison segment sizes indicate that the 2-D MMD algorithm introduces less visual distortion when short segments are used. It should be noted that the decision to choose one of two pixels should be based on the nearby or neighboring pixels; a pixel that is 8 positions away is not likely to have any useful information about what can be safely discarded.

From the above observations, it will be appreciated that it is desirable to use a small value for l the comparison segment size in the 2-D MMD algorithm. Unfortunately, there is a restriction imposed on l such that l be greater than or equal to m, the compression factor, i.e., $l \geq m$. If l were less than m, a comparison segment could not fill a complete row or column of an m×m block and an intersection between selected horizontal and vertical segments could not be guaranteed. Thus, if a compression factor of 2 is selected, the smallest comparison size possible is 2.

Figure 5:
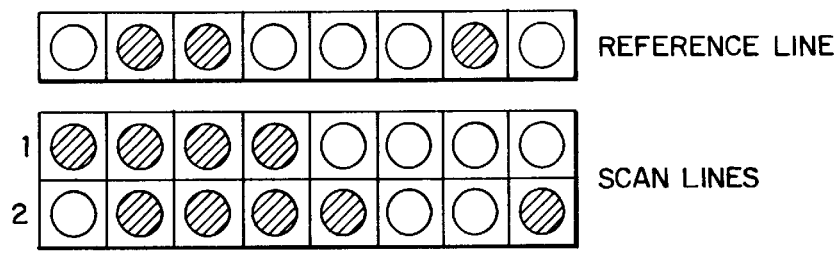
FIG. 5 illustrates an example of one-dimensional vertical 2:1 compression which advantageously employed in a first stage of a two-dimensional Asymmetrical Maximum Differences (2-D AMD) codec according to the present invention.

In order to achieve a smaller comparison size (l1=1), the constraint that the horizontal and vertical image reduction steps be performed simultaneously advantageously can be relaxed, resulting in an asymmetrical encoder. Table 3 lists the two steps that are performed by this 2-Dimensional Asymmetrical Maximum Differences (2-D AMD) encoder. It should be noted that the 2-D AMD represents a new approach for coding images and is considered to be another preferred embodiment according to the present invention. First, a vertical compression by a factor of $m_y$ is achieved by using the original one-dimensional encoder with a comparison size of 1. With such a low value for l, each pixel segment contains just one pixel, and the criteria for selecting a pixel segment degenerates into just one, i.e., if any of the pixels differs from the reference pixel in color, then that pixel is used in the reduced image; otherwise, the reference pixel is used. The original rule concerning bit transitions no longer applies since there is only one pixel now. As before, the selected pixels become the new reference line for the next comparison. Finally, a horizontal reduction by a factor of $m_y$ is achieved in an identical manner, but along the other axis, for a total reduction of $m_x \times m_y$. FIG. 5 illustrates the one-dimensional 2:1 vertical compression technique, the first stage of the 2-D AMD encoder.

TABLE 3

| Stage 1 | Vertical reduction by a factor of $m_y$ using one-dimensional Maximum Differences algorithm with a comparison pixel segment size of 1 |
|---|---|
| Stage 2 | Horizontal reduction by a factor of $m_x$ using one-dimensional Maximum Differences algorithm with a comparison pixel segment size of 1 |

The 2-D AMD algorithm compromises symmetry for a small comparison pixel segment size, but experiments have shown that the lack of symmetry during the reduction process does not introduce any noticeable distortion into the reconstructed image. It should also be noted that the horizontal compression is intentionally performed last because typical handwritten and typed documents tend to have more redundancy in the vertical direction than in the horizontal direction. In short, there is a significant amount of vertical strokes in most letters, so the horizontal reduction stage can be more sensitive to pixel-removal decisions when the compression factor used is high enough to compensate for its extra resolution in standard mode.

It will be appreciated that there are two other minor differences between the 2-D AMD algorithm and the 2-D MMD algorithms. First, according to the 2-D AMD algorithm, the reduction factors for the horizontal and vertical stages are no longer constrained to be the same. This extra parameter advantageously was added to accommodate standard mode facsimile images, which do not have equal horizontal and vertical resolutions. The other difference is that the essentially "brute-force" inclusive OR stages in the 2-D MMD algorithm have been omitted from the 2-D AMD algorithm. The demand for higher quality reconstructed images led to a decrease in the amount of image reduction possible, making only one reduction level necessary.

The 2-D AMD encoder maintains important details when compressing facsimile documents. However, it is only capable of scaling down images by integral compression factors. To permit non-integer compression ratios to be realized, the 2-D AMD algorithm was further modified to allow the use of fractional compression factors, thus giving rise to the 2-Dimensional Fractional Maximum Differences (2-D FMD) algorithm, which represents a third preferred embodiments according to the present invention. The 2-D FMD algorithm is also asymmetrical and performs the two compression stages in the same order, vertical compression followed by horizontal compression. It will be readily appreciated that the 2-D FMD can be considered as the convolution of 1-D FMD and its transpose. The only high-level difference is that the new "fractional" reduction algorithm compresses every $m_{yn}$ lines down to $m_{yd}$ and every $m_{xn}$ columns down to $m_{xd}$, rather than $m_y$ lines down to 1 and $m_x$ columns down to 1, as illustrated in Table 4. This advantageously allows fractional reductions, such as 3/2:1, 4/3:1 and 5/3:1, along each axis.

TABLE 4

| Stage 1 | Vertical reduction by a factor of $m_{yd}/m_{yd}$ using one-dimensional fractional Maximum Differences algorithm with a comparison pixel segment size of 1 |
|---|---|
| Stage 2 | Horizontal reduction by a factor of $m_{xn}/m_{xd}$ using one-dimensional fractional Maximum Differences algorithm with a comparison pixel segment size of 1 |

The new 2-D FMD algorithm reduces an image by detecting contiguous pixels and removing them individually when possible. The rules that dictate which pixels are to be eliminated advantageously can be developed heuristically and are based on the rules employed by the 2-D AMD algorithm discussed in greater detail above. As before, the horizontal reduction rules are identical to the vertical rules, but their respective compression factors advantageously can differ. A reference line or column must still be maintained, and is always taken from the bottommost line or right-most column of the previous line/column reduction's output. During vertical compression, every column of an $m_{yn}$ line portion of the page forms an $m_{yn}$ pixel segment that must be replaced with a shorter $m_{yd}$ pixel segment. Similarly, for horizontal compression, every $m_{xn}$ pixel horizontal segment in an $m_{xn}$ column region must be replaced with a shorter $m_{xd}$ pixel segment.

When reducing $m_n$ pixels down to $m_d$ (along either axis), there are two types of redundancies that can be exploited to eliminate a pixel. First, there is the likely possibility that two adjacent pixels in the segment are of the same color. When this situation is detected, the encoder throws away one of the two pixels. Second, the color of the first pixel in the segment (upper or leftmost) is compared with the color of the corresponding reference pixel. If they are the same, then the first pixel in the segment is eliminated. In either of these reduction strategies, when a pixel is removed, another pixel of the same color always remains in the adjacent position. Because of this, it is unlikely that a significant amount of visual distortion will be introduced, since the human eye cannot easily detect the displacement of anything by just one pixel position.

If no redundancy is detected in the pixel segment, the encoder is forced to adopt a third rule and remove pixels from the end of the segment until it is down to the correct size. Unfortunately, this action is likely to introduce noticeable visual distortion. However, this situation only arises when documents with tiny fonts or small details are encoded. It will be appreciated that these images are not suitable for reliable facsimile transmission anyway.

Figure 6:
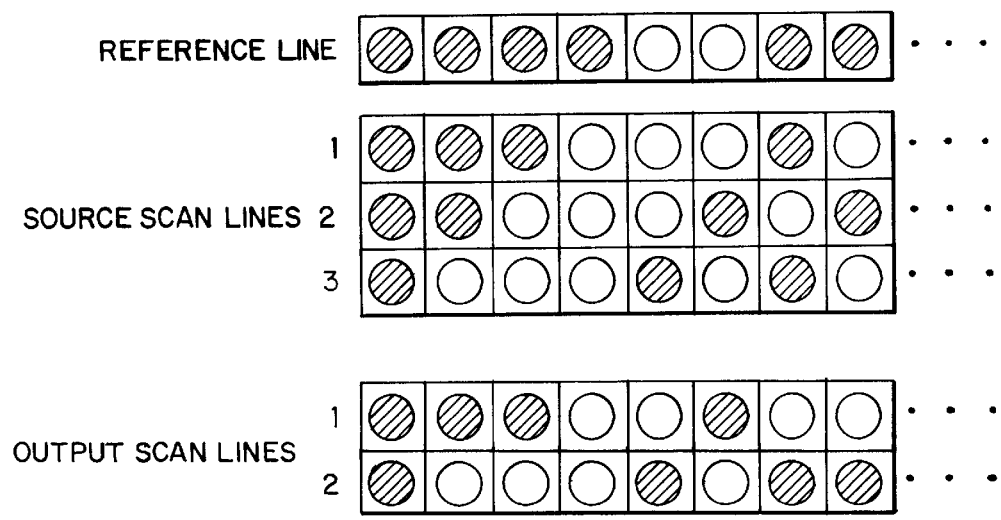
FIG. 6 illustrates an example of 3:2 vertical reduction which advantageously can be employed as a first stage of the two-dimensional Fractional Maximum Differences (2-D FMD) algorithm according to the present invention.

FIG. 6 is an exemplary case illustrating the operation of one of the components of the 2-D FMD algorithm, i.e., a one-dimensional 3:2 vertical reduction (1-D FMD) stage. The diagram is useful in understanding how 3 scan lines can be replaced by 2 scan lines by removing unnecessary redundancy. The first five columns are examples of the first pixel-elimination rule, discussed immediately above. The sixth and seventh columns demonstrate the second rule, also discussed immediately above. Finally, the last column is an example where neither rule could be applied and the segment had to be truncated.

It will be appreciated that one feature of the 2-D FMD algorithm is that it is a superset of the 2-D AMD encoder. That is, if the reduction ratio happens to reduce to an integer (has a 1 in the denominator), the 2-D FMD encoder gives the exact same results as would be obtained using the 2-D AMD encoder. By eliminating adjacent pixels of the same color, the single pixel that is left behind is always the one that is "most different" from the reference pixel.

For typed documents with small fonts, a noticeable form of distortion has appeared on the encoded images along the upper and lower edges of many characters. The "jaggedness" appears to be the result of the poor vertical resolution of the standard resolution Group 3 facsimile image. The Maximum Differences family of algorithms, i.e., 1-D MD, 2-D MMD, 2-D AMD and 2-D FMD, were designed working under the assumption that the displacement of a pixel by one position is negligible, i.e., unnoticed by the human eye. However, for standard mode images, this does not seem to be the case with respect to the vertical direction. Often, a single black pixel on the edge of a typed character is moved up or down by one pixel with respect to its neighbors to preserve details inside the character. Unfortunately, this pixel then sticks out enough to make the letter appear unpleasantly jagged.

The problem appears to be related to the priorities used for the selection of a pixel-removal strategy. Previously, two forms of redundancy were described that can be eliminated when reducing a pixel segment of size $m_{yn}$ to one of size $m_{yd}$. The compression algorithm gave the highest priority to the removal of the first type of redundancy, adjacent pixels of the same color. If that condition was not present, the second pixel-removing strategy was attempted. The undesirable distortion described occurs frequently in places where different pixel-removal rules are applied to adjacent columns.

To help alleviate this problem, the pixel-removal priority system for vertical compression advantageously can be modified. When reducing a segment, the encoder attempts to use the same scheme that was used for the compression of the segment immediately to its left. If this is not possible, then it attempts the other pixel-removal strategy. With this new set of priorities, the chances of a particular column being bit-reduced by a different scheme than its neighbors are greatly reduced. This technique is only employed during vertical reduction; standard mode facsimile images have a high enough horizontal resolution that it is unnecessary during horizontal compression.

At the decoding end of the communications channel, the bit-reduced image is expanded back to the original size. The expansion (or decoding) algorithm must interpolate all of the missing pixel information so that the reconstructed image has smooth, well-formed typed characters and pen strokes. Several different techniques according to addition preferred embodiments according to the present invention advantageously can be employed during decoding. These techniques are described in greater detail immediately below.

All of the decoding algorithms according to the present invention work on the same basic principle. To uniformly expand the facsimile page, each pixel (or group of pixels) must be replaced by a larger block of pixels. The size of this block depends upon the particular compression factors that were used in the encoder side of the transmission channel. For example, a 2×2 compressed image can be expanded by replacing each pixel with a square consisting of four pixels. For the decoder to produce a reconstructed image of good quality, the contents of this larger block must be coherent with respect to the surrounding pixels. That is, the decoder must attempt to interpolate and fill in this block with pixel patterns that "connect" well with those in the surrounding blocks. In order to do this, the expansion algorithm(s) advantageously use information not only from the pixel or group of pixels being expanded, but also from adjacent, i.e., neighboring, pixels in the reduced image.

The expansion algorithm, which was previously disclosed in U.S. Pat. No. 5,293,251, was designed to decode images that were reduced by a factor of 4 along each axis by the original Maximum Differences encoder, i.e., algorithm, described earlier. For example, the 1-D MD decoder uses a simple set of interpolation rules to convert a 432×550 reduced image back into a 1728×2200 fine mode facsimile document.

The routine employed by the 1-D MD decoder consists of an asymmetrical algorithm that performs the horizontal and vertical expansions in two separate stages, as listed in Table 5. The image is first augmented in the horizontal direction by a procedure that replaces each pixel with a straight segment of four pixels in a row. The decoder determines the contents of this segment by examining the pixel being expanded and six of its neighboring pixels and by then employing a set of interpolation rules designed to smoothly connect them. Subsequently, the vertical expansion is performed using the exact same procedure, but transposed. That is, each pixel in the horizontally expanded image is replaced by a column of four pixels whose contents are determined by the same set of interpolation rules. The surrounding pixels that are examined when interpolating are also the same as those from the horizontal expansion, but rotated by 90 degrees.

TABLE 5

| Stage 1 | Horizontal expansion by a factor of 4 using one-dimensional decoder based on interpolation rules |
|---|---|
| Stage 2 | Vertical expansion by a factor of 4 using one-dimensional decoder based on interpolation rules |

The interpolation rules, which were disclosed in U.S. Pat. No. 5,293,251, are illustrated in detail in FIG. 7. In FIG. 7(a), the symbols a0 through a6 represent the pixel to be expanded and its neighbors in the encoded image, and b 1 through b4 represent the expanded segment replacing it. If the source pixel a0 is white, then it is always expanded to a string of white pixels. e.g., b1=b2=b3=b4=white. If a0 is black but is surrounded by white or black pixels on either side, a2=a5=white OR a2 =a5 =black, then a0 is expanded to a string of black pixels, i.e., b1=b2=b3=b4=black. Finally, if a0 is black but only one of its non-diagonal neighbors is black, e.g., a2 and a5 are of a different color, then a0 is expanded to a string of black pixels only if one of the opposite corners contains a black pixel, i.e., EITHER a2=black and a4 or a6=black OR a5=black and a1 or a3=black). Otherwise, the decoded segment replacing a0 contains two contiguous black pixels on the side with the black neighbor and two contiguous white pixels on the side with the white neighbor. These instructions are followed during both stages of decompression; the a0 through a6 and b0 through b4 used for horizontal decoding are simply transposed for vertical decoding.

It should be noted that because this algorithm is asymmetrical, the order in which each stage of expansion is performed has a significant effect on the results obtained. For example, as a consequence of the fact that vertical expansion is performed last, strings of pixels occasionally form vertical lines one pixel wide on the insides of letters with small openings (such as a lowercase 'e'). Had the order of expansion been reversed, this same effect would have been observed with horizontal strings of pixels.

In order to resolve any difficulties that arise when expansions along each axis do not impact the reconstructed image in the same manner, a new symmetrical version of the 4×4 decoder, i.e., decoding algorithm, advantageously can be provided as yet another preferred embodiment according to the present invention. The modified-symmetrical (M-S) decoder performs both horizontal and vertical expansions simultaneously by replacing each pixel in the source image by a 4×4 pixel block, resulting in a factor of 4 expansion along each axis. The particular rules that would be applied during the horizontal and vertical expansion stages of the asymmetrical decoder are combined to produce this decoded block. The examples in FIG. 8 illustrate exactly how this is done. The 4-pixel segments produced from applying the interpolation rules along each axis are replicated 4 times and arranged into two 4×4 blocks. Then, these two blocks are combined into one block by a logical AND operation which advantageously preserves white pixels, resulting in the decoded 4×4 block. It will be appreciated that this technique is capable of interpolating for missing pixels during image expansion in exactly the same manner along each axis.

The development of the interpolation rules shown in FIG. 7 was achieved on a heuristic basis regarding what pixels patterns would best fill in the missing space in an encoded document in each of the possible surrounding pixel scenarios. They were then refined following a number of experiments using typical handwritten documents. Thus, although the performance of the 4×4 decoder with interpolation rules has demonstrated their soundness, they may not be the optimal set of rules.

One limitation of these decoding algorithms is that they are incapable of constructing expanded images with pen strokes that are as smooth as in the original. This is because the interpolation rules employed never allow any entities smaller than a two-pixel segment in the asymmetrical decoder or a 2×2 pixel block in symmetrical decoder to appear in the reconstructed image. In effect, this lowers the resolution of the expanded document by a factor of 2 in one dimension for the asymmetrical decoder and in both dimensions for the symmetrical decoder. As a result, decoded images may appear coarse and exhibit jagged lines. This distortion does not affect the intelligibility of the document, but is noticeable.

In order to improve the quality of the reconstructed documents produced by the decoder in the communications channel, it is necessary to introduce a greater number of possible pixel sequences. This would ensure enough diversity in the image to allow finer detail and thus smoother interpolation. Rather than generating a longer and more sophisticated set of interpolation rules to accomplish this, a more general approach has been developed. The symmetrical 4×4 decoder was modified to use a lookup table rather than a set of rules to generate the pixel segments in the decoded image. That way, every pixel combination in the encoded image can map to its own reconstructed sequence, resulting in the best possible use of the available information.

The Table-Driven (T-D) decoder achieves a factor of 4 expansion along each axis by replacing every pixel in the encoded image by a 4×4 block of pixels. The contents of the source pixel and its eight adjacent neighboring pixels form a 3×3 block, which is the index of the lookup table. For each index, the table contains a 4×4 block that is to be placed in the reconstructed document. Thus, the lookup table is a basically 3×3 to 4×4 pixel block mapping. It contains $2^8$=256 entries of 16 bits each for a total size of 512 bytes.

The T-D decoding approach is general because any set of interpolation rules can be implemented with it simply by modifying the table, including those of the symmetrical 4×4 decoder. However, because of the much larger number of possible 4×4 blocks capable of being generated, there is an opportunity for much more diversity and detail in the reconstructed image than with the interpolation rule-based methods. The mappings that are actually used by this decoder are a set of ad-hoc associations derived heuristically. They are designed to connect lines and curves smoothly so that the expanded image is of good quality. FIG. 9 contains some examples of the mappings in this table. Although there are 256 entries, only 104 actually needed to be constructed from scratch; the remaining were generated by taking symmetry into account in the 3×3 and 4×4 blocks and applying each of the 104 mappings to 1, 2, 4, or 8 entries in the table when possible.

The quality of the reconstructed images produced by the 4×4 lookup table decoder is clearly better than that of the interpolation rule-based decoders. However, because the table was generated on an ad hoc basis rather than by training there is scope for further adaptive optimization of the T-D decoder based upon the statistics of the documents being encoded.

Results from the interpolation-based rule and table-driven decoders have shown that when expanding images, the contents of the pixels that are adjacent to the pixel being expanded are very useful in deciding what sequence to expand it to. However, neither of the 4×4 decoders make the best possible use of this information; both employ a "best guess" strategy based upon intuition and common sense rather that the actual statistical properties of the encoded documents.

For the 2-D FMD encoder described above, which reduces a sequence of $m_n$ pixels down to $m_d$ pixels, it was observed that any given sequence of $m_d$ pixels could only have been arrived at by a limited number of $m_n$ pixel sequence combinations. In addition, the particular combination that let to it seemed to be heavily related to the contents of the neighboring pixels to that segment. These observations were the motivation for the development of a new statistical decoding technique.

FIG. 10 is a compilation of contains some statistics on the 3:2 vertical compression of a set of typical handwritten and typed documents by the 2-D FMD encoder discussed in greater detail above. FIG. 10 lists the number of times each 2-pixel output segment possibility occurred for each 3-pixel input combination. To determine the statistical significance of this mapping on the encoded pixel sequence's neighboring pixels, each output segment is split into four parts which are tallied separately, each representing a possible combination of the two neighboring pixels on either end of the output segment. The two output pixels and their neighbors thus form a straight line in the image; the 2-pixel output segment is in parentheses in the table.

FIG. 10 shows a clear correlation between the particular encoding decision that was made and the 2 neighboring pixels in the encoded image. A notable example is the output pixel sequence BB (two adjacent black pixels). When it is surrounded by black pixels on each side, there is a 100% chance that the corresponding pixel sequence in the original document was BBB. When it is surrounded by two white pixels, on the other hand, here is roughly a 50% chance that the original pixel sequence was BBB and a 50% chance that it was WBB. Thus, the two outer surrounding pixels in the encoded image contain valuable information regarding how the segment was encoded.

A statistical decoder according to yet another preferred embodiment of the present invention advantageously makes optimal use of this information and at the same time permits simpler implementations to be realized. The asymmetrical algorithm expands an image by fractional amounts first horizontally and then vertically, essentially "undoing" the steps performed by the 2-D FMD encoder. That is, each $m_{xd}$ pixel horizontal segment is replaced by a larger $m_{xn}$-pixel segment, and then each $m_{yd}$-pixel vertical segment is replaced by a larger $m_{yd}$-pixel segment. In order to do this, two tables are first generated from the horizontal and vertical encoder statistics which contain the optimal $m_d$-pixel sequence, based upon its two outer neighbors in the encoded image. The particular $m_n$-pixel segments selected for the table are those that would result in the fewest number of pixel errors in the reconstructed document, based upon the number of occurrences of each encoder mapping. These tables are then used by the decoder when expanding each pixel segment.

One property of the human visual system that can be exploited when generating a decoder table is the fact that the eye is far more sensitive to pixel errors where a pixel that was black in the original image is incorrectly decoded to a white pixel (a white pixel error) than to errors where a white pixel is decoded to a black pixel (a black pixel error). This makes intuitive sense because white pixel errors leave gaps in the lines that construct handwritten letters or typed characters and make them harder to recognize. Black pixel errors, on the other hand, merely make the lines thicker and distort their shape somewhat, but do little to degrade an image's readability.

To take this property into account, the decoder table generator was generated by computing the perceived error of a reconstructed document as a weighted sum of the number of black pixel errors and the number of white pixel errors. The coefficients that were chosen preferably are based upon the assumption that a white pixel error introduces twice as much distortion to the reconstructed image as a black pixel error does, resulting in a slight bias towards black pixels errors. It should be noted that other weighing factors are possible and, indeed, may be more suitable. The algorithm then generates a decoder table that would minimize this weighted sum in the expanded image. Table 6 contains example mappings for five training documents.

TABLE 6

| B(BB)B | BBB | B(BW)B | BWW |
|---|---|---|---|
| B(BB)W | BBB | B(BW)W | BBW |
| W(BB)B | BBB | W(BW)B | BBW |
| W(BB)W | BBB | W(BW)W | BBW |
| B(WB)B | WWB | B(WW)B | WWW |
| B(WB)W | WBB | B(WW)W | WWW |
| W(WB)B | WWB | W(WW)B | WWW |
| W(WB)W | WBB | W(WW)W | WWW |

Once an image has been bit-reduced in the manner defined in greater detail above, the resulting horizontal run-lengths are encoded using a variable length Huffman code. This codebook used for this process needs to be optimized to exploit the bit-reduced image run-length statistics (i.e., the probability density function). It should be noted that the re-optimized Huffman code does not achieve the level of compression that Huffman coding realizes over uncompressed images. However, the combination of bit-reduction and re-optimized Huffman coding achieves a total compression ratio that exceeds that offered by standard T.4 encoding. The methods for generating, encoding and decoding Huffman-based codes are described adequately in the publication of Richard W. Hamming, entitled "Coding of Information Theory", Prentice-Hall, Englewood Cliffs, N.J. 07632, (1980), which is incorporated by reference herein for all purposes.

It will be appreciated that the present invention is not limited to the above-described encoding and decoding methods. As shown in FIG. 2, a communications channel includes an inverse coder 10, a 2-D maximum differences encoder 20, an optimizer Huffman run-length coder 30, a transmission link 35, an inverse-optimized Huffman run-length decoder 40, a 2-D maximum differences decoder 50 and a conventional T4 Huffman run-length coder 60. The encoder 20 can be selected from the 2-D MMD, the 2-D AMD and the 2-D FMD encoders. The decoder 50 advantageously may be selected from the M-S decoder or the T-D decoder, which are described in greater above.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A communications channel including encoding means for encoding an image signal representing an original image and transmitting means for transmitting said encoded image signal, said encoding means comprising:
    means for encoding said original image using maximum differences between row and column segments and corresponding segments of respective reference pixel strings to thereby produce a compressed image.
2. A communications channel according to claim 1, further comprising recovery means for recovering said original image from a Group 3 facsimile signal, the recovered original image signal being provided to said encoding means.
3. A communications channel according to claim 2, further comprising expansion means receiving said compressed image for expanding said compressed image to produce a recovered image.
4. A communications channel according to claim 3, further comprising:
    means receiving said compressed image for performing optimized run-length coding to thereby provide transmission data;
    means receiving said transmission data for performing optimized run-length decoding thereon so as to reproduce said compressed image, said reproduced compressed image being provided to said expansion means; and
    means receiving said recovered image for generating a signal corresponding to said Group 3 facsimile signal.
5. A communications channel according to claim 1, wherein said means for encoding comprises first means for simultaneously horizontally and vertically reducing said original image using maximum differences to obtain said compressed image.
6. A communications channel according to claim 1, wherein said compressed image is an intermediate sized image, and said first means simultaneously horizontally and vertically reduces the original image by a factor of m responsive to maximum differences between rows and columns and respective references with pixel segments of size 1 to thereby generate a first stage compressed image, said encoding means further comprising:
    second means for vertically reducing said first stage compressed image by an additional factor of n using inclusive ORing so as to combine n of said rows into one row thereby generating a second stage compressed image; and
    third means for horizontally reducing said second stage compressed image by an additional factor of n using inclusive ORing so as to combine n of said columns into one column thereby generating said intermediate sized image;
    wherein e, m, and n are all integers greater than or equal to 1.
7. A communications channel according to claim 1, wherein said first means forms said first stage compressed image of pixels occupying intersection points between said row and said columns.
8. A communications channel according to claim 7, wherein $1 \geq m$.
9. A communications channel according to claim 1, wherein said compressed image represents an intermediate sized image, and wherein said means for encoding comprises:
    first means for vertically reducing the original image by a factor of $m_y$ responsive to maximum differences between rows and a respective first reference with pixel segments of size 1 to thereby generate a first stage compressed image; and
    second means for horizontally reducing said first stage compressed image by an additional factor of $m_x$ responsive to maximum differences between columns and a respective second reference with pixel segments of size 1 thereby generating an intermediate sized image;
    wherein $m_x$, $m_y$ are integers greater than or equal to 1.
10. A communications channel according to claim 9, wherein $m_y$ is not equal to $m_x$.
11. A communications channel according to claim 9, wherein said first and second means reduce said original image by removing pixels in accordance with pixel removal criteria, and wherein a pixel removal criteria applied to a present one of said segments of size 1 is preferentially a respective pixel removal criteria used in pixel replacement of an adjacent one of said segments of size 1.
12. A communications channel according to claim 9, wherein said intermediate sized image is a fractional intermediate sized image, wherein said first means comprises means for vertically reducing the original image by a factor of $m_{yn}/m_{yd}$ responsive to maximum differences between said rows and said first reference with pixel segments of size 1 to thereby generate a first stage compressed image, and wherein said second means comprises means for horizontally reducing said first stage compressed image by an additional factor of $m_{xn}/m_{xd}$ responsive to maximum differences between said columns and said second reference with pixel segments of size 1 to thereby generate the fractional intermediate sized image;
    wherein $m_{yn}$, $m_{yd}$, $m_{xn}$ and $m_{xd}$ are all integers greater than or equal to 1.
13. A communications channel according to claim 12, wherein said first and second means reduce said original image by removing pixels in accordance with pixel removal criteria, and wherein a pixel removal criteria applied to a present one of said segments of size 1 is preferentially a respective pixel removal criteria used in pixel replacement of an adjacent one of said segments of size 1.
14. A communications channel according to claim 1, wherein said compressed image represents an intermediate sized image, said communications channel further comprising decoding means for receiving said encoded image signal and generating a reconstructed image, said decoding means comprising:
    first means for simultaneously horizontally and vertically expanding the intermediate sized image by a factor of m to thereby generate a plurality of first and second sets of m×m pixels; and
    second means for logically ANDing respective ones of said first and second sets to thereby generate a resultant set of m×m pixels to thereby generate said reconstructed image;

wherein m is an integer greater than or equal to 1.

15. A communications channel according to claim 14, wherein said first means uses a predetermined set of interpolation rules as follows:

if a)=white, then b1=b2=b3=b4=white
if a0=black, then
   if a2=a5, then b1=b2=b3=b4=black
   if a2≠a5, then
     if a2=black, then
       if (a4=black) OR (a6=black), then b1=b2=b3=b4=black
     otherwise, b1=b2=black, b3=b4=white
     if a5=black, then
       if (a1=black) OR (a3=black), then b1=b2=b3=b4=black otherwise, b1=b2=white, b3=b4=black where a0 is the pixel of interest, a1–a6 are pixels adjacent to pixel a0 and b1–b4 are resultant pixels replacing pixel a0.

16. A communications channel according to claim 1, wherein said compressed image represents an intermediate sized image, said communications channel further comprising decoding means for receiving said encoded image signal and generating a reconstructed image, said decoding means comprising:

a lookup table for storing m×n expansion data;

means for supplying an address identifying a pixel of interest and a predetermined number of pixels adjacent thereto to said lookup table, whereby said lookup table produces an addressed one of said m×n expansion data so as to generate said reconstructed image, where m and n are integers greater than or equal to 1.

17. A communications channel according to claim 1, wherein said compressed image represents an intermediate sized image, said communications channel further comprising decoding means for receiving said encoded image signal and generating a reconstructed image, said decoding means comprising:

a lookup table for storing first and second expansion data;

means for replacing each $m_{xd}$ pixel horizontal segment by a larger $m_{xn}$-pixel segment included in the first expansion data to thereby produce a first stage expanded image; and means for replacing each $m_{yd}$-pixel vertical segment by a larger $m_{yd}$-pixel segment included in the second expansion data to thereby produce the reconstructed image.

18. A communications channel according to claim 17, wherein the first and the second expansion data are based on statistical probabilities that m pixels and pixels adjacent thereto would produce n pixels and said pixels adjacent thereto during a corresponding fractional maximum differences encoding operation.

19. A communications channel according to claim 17, wherein the first and the second expansion data are selected such that errors in the reconstructed image are weighted towards black pixel errors.

20. A communications channel according to claim 1, further comprising:

first means for recovering said original image from a Group 3 facsimile signal;

second means including said means for encoding, for vertically reducing said original image by a factor of $m_y$ responsive to maximum differences between rows and a respective first reference with pixel segments of size 1 to thereby generate a first stage compressed image and for horizontally reducing said first stage compressed image by an additional factor of $m_x$ responsive to maximum differences between columns and a respective second reference with pixel segments of size 1, where $m_x$ and $m_y$ are integers greater than or equal to 1, to thereby produce an asymmetrical intermediate compressed image;

third means receiving said asymmetrical intermediate compressed image for performing optimized run-length coding to thereby provide transmission data;

fourth means receiving said transmission data for performing optimized run-length decoding thereon so as to produce a second intermediate compressed image;

fifth means receiving said second intermediate compressed image for entering a look table using an address formed by pixels of interest and surrounding pixels and for producing a pixel block larger than said pixels of interest so as to produce a recovered image; and sixth means receiving said recovered image for generating a signal corresponding to said Group 3 facsimile signal.

21. A communications channel according to claim 20, wherein said asymmetrical intermediate compressed image is a fractional intermediate compressed image, wherein said second means comprises:

seventh means for vertically reducing the original image by a factor of $m_{xn}/m_{yd}$ responsive to maximum differences between said rows and said first reference with pixel segments of size 1 to thereby generate a first stage compressed image; and eighth means for horizontally reducing said first stage compressed image by an additional factor of $m_{xn}/m_{xd}$ responsive to maximum differences between said columns and said second reference with pixel segments of size 1 thereby generating said fractional intermediate compressed image;

wherein $m_{yn}$, $m_{yd}$, and $m_{xd}$ are all integers greater than or equal to 1.

22. In a communications channel, a method of communicating an image in compressed form, said method comprising the steps of encoding an image signal representing an original image and transmitting said encoded image signal, said step of generating said encoded image signal comprising the step of encoding said original image using maximum differences between row and column segments and corresponding segments of respective reference pixel strings to thereby produce a compressed image.

* * * * *